US012760764B2

(12) United States Patent
Gong et al.

(10) Patent No.: US 12,760,764 B2
(45) Date of Patent: Oct. 13, 2026

(54) MAGNETIC BEARING, COMPRESSOR AND AIR CONDITIONER

(71) Applicant: GREE ELECTRIC APPLIANCES, INC. OF ZHUHAI, Zhuhai (CN)

(72) Inventors: Gao Gong, Zhuhai (CN); Fei Wang, Zhuhai (CN); Rui Wu, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 184 days.

(21) Appl. No.: 18/845,382

(22) PCT Filed: Dec. 22, 2022

(86) PCT No.: PCT/CN2022/140866

§ 371 (c)(1),
(2) Date: Sep. 9, 2024

(87) PCT Pub. No.: WO2023/226405

PCT Pub. Date: Nov. 30, 2023

(65) Prior Publication Data

US 2025/0188990 A1 Jun. 12, 2025

(30) Foreign Application Priority Data

May 26, 2022 (CN) ........................ 202210582036.X

(51) Int. Cl.
*F16C 32/04* (2006.01)

(52) U.S. Cl.
CPC ...... *F16C 32/0485* (2013.01); *F16C 32/0465* (2013.01); *F16C 2360/00* (2013.01)

(58) Field of Classification Search
CPC .............. F16C 32/0485; F16C 32/0465; F16C 2360/00

(Continued)

(56) References Cited

U.S. PATENT DOCUMENTS 7,015,612 B2 * 3/2006 Fujinaka ................ H02K 7/085 310/90.5
7,391,128 B2 * 6/2008 Rozmus .............. F16C 32/0417 290/55

(Continued)

FOREIGN PATENT DOCUMENTS

CN 102900761 A 1/2013
CN 102305242 B 3/2013

(Continued)

OTHER PUBLICATIONS

Yue et al., English Machine Translation of CN212564071 (Year: 2020).*

(Continued)

*Primary Examiner* — Rashad H Johnson
(74) *Attorney, Agent, or Firm* — Christensen O'Connor Johnson Kindness PLLC

(57) ABSTRACT

A magnetic bearing, a compressor and an air conditioner. The magnetic bearing comprises: an axial iron core, permanent magnets, a magnetic conductive ring and a magnetic steel fixing frame; the permanent magnets comprise a first permanent magnet located on one axial side of the magnetic conductive ring and a second permanent magnet located on the other axial side of the magnetic conductive ring; the first permanent magnet is located between the magnetic conductive ring and the axial iron core and is connected to the magnetic conductive ring and the axial iron core; the second permanent magnet is located between the magnetic conductive ring and the axial iron core and is connected to the magnetic conductive ring and the axial iron core. The magnetic steel fixing frame can fix and support the radial inner sides of the permanent magnets.

20 Claims, 7 Drawing Sheets

(58) Field of Classification Search
USPC .......................................................... 310/90.5
See application file for complete search history.

(56) References Cited

U.S. PATENT DOCUMENTS

| | | | | |
|---|---|---|---|---|
| 8,330,311 | B2 * | 12/2012 | Ramsey | F16C 32/0446 310/90.5 |
| 2001/0013734 | A1 * | 8/2001 | Kanebako | F16C 32/0493 310/90.5 |
| 2004/0075355 | A1 | 4/2004 | Ries et al. | |
| 2006/0145551 | A1 * | 7/2006 | Rozmus | F16C 29/045 310/90.5 |
| 2006/0220481 | A1 * | 10/2006 | Takekawa | H02K 11/225 310/90.5 |
| 2008/0278012 | A1 * | 11/2008 | Matsubara | H02K 7/085 310/90.5 |
| 2010/0283340 | A1 * | 11/2010 | Fradella | H02K 7/025 310/90.5 |
| 2013/0033136 | A1 * | 2/2013 | McMullen | H02K 7/025 310/90.5 |
| 2015/0275964 | A1 * | 10/2015 | Moravec | F16C 32/048 310/90.5 |
| 2015/0303768 | A1 * | 10/2015 | Henderson | B60L 13/04 310/90.5 |
| 2018/0238387 | A1 * | 8/2018 | Tangudu | F16C 32/0465 |
| 2020/0025246 | A1 * | 1/2020 | Tangudu | F16C 32/0468 |
| 2021/0003171 | A1 * | 1/2021 | Tangudu | F16C 32/0461 |
| 2021/0131492 | A1 * | 5/2021 | Tangudu | F16C 32/0459 |
| 2025/0163962 | A1 * | 5/2025 | Hu | F04B 39/00 |

FOREIGN PATENT DOCUMENTS

| | | | |
|---|---|---|---|
| CN | 103939465 | A | 7/2014 |
| CN | 108644230 | A | 10/2018 |
| CN | 209083815 | U | 7/2019 |
| CN | 110864043 | A | 3/2020 |
| CN | 211623964 | U | 10/2020 |
| CN | 212564071 | U | 2/2021 |
| CN | 113503317 | A | 10/2021 |
| CN | 113586609 | A | 11/2021 |
| CN | 215634424 | U | 1/2022 |
| CN | 216111750 | U | 3/2022 |
| CN | 115045913 | A | 9/2022 |
| CN | 217381308 | U | 9/2022 |
| JP | 2007056892 | A | 3/2007 |

OTHER PUBLICATIONS

Zhang et al., English Machine Translation of CN102305242 (Year: 2011).*

Office Action mailed May 30, 2025, in corresponding Chinese application No. 202210582036.X, filed May 26, 2025, 15 pages.

Extended European Search Report mailed Apr. 28, 2025, issued in corresponding European Application No. EP 22943592, filed Dec. 12, 2022, 10 pages.

International Search Report and Written Opinion mailed Mar. 12, 2023, issued in corresponding International Application No. PCT/CN2022/140866, filed Dec. 22, 2022, 15 pages.

* cited by examiner

MAGNETIC BEARING, COMPRESSOR AND AIR CONDITIONER

CROSS-REFERENCE TO RELATED APPLICATIONS

This application is the national phase under 35 U.S.C. § 371 of PCT International Application No. PCT/CN2022/140866, which has an international filing date of Dec. 22, 2022 and claims priority of Chinese patent application No. 202210582036.X. The contents of the above identified PCT international application and Chinese patent application are hereby incorporated in their entireties by reference for all purposes.

TECHNICAL FIELD

The present disclosure relates to the field of magnetic levitation technologies, and in particular, to a magnetic bearing, a compressor and an air conditioner.

BACKGROUND

Magnetic bearings have a series of excellent qualities such as no contact, no wear, high speed, high precision, no need for lubrication and sealing, etc. They are high-tech products integrating electromagnetism, electronic technology, control engineering, signal processing and mechanics.

Magnetic bearings are divided into three types: active, passive, and hybrid. An active magnetic bearing has high stiffness and can be precisely controlled, but volume and power consumption required to produce unit load-bearing capacity are large. By using attraction or repulsion between magnetic materials to achieve rotor levitation, a passive magnetic bearing has relatively low stiffness and damping. By using a permanent magnet to provide a bias magnetic field to replace a static bias magnetic field generated by an electromagnet in an active magnetic bearing, a hybrid magnetic bearing reduces the ampere-turns of control winding, reduces volume of bearing, and improves the bearing capacity. The hybrid magnetic bearing has irreplaceable advantages in areas with strict requirements on volume and power consumption, and magnetic bearings are mainly used in high-speed and ultra-high-speed applications. Therefore, integration and miniaturization of magnetic levitation systems and improving stability and reliability of control systems will be key research directions.

A structure of a three-degree-of-freedom magnetic bearing in the related art is shown in FIG. 1. A permanent magnet 2 generates a radial-axial bias magnetic field 3, forming a bias magnetic flux in axial and radial air gaps among an axial iron core 5, a radial iron core 10 and a bearing rotor 11. An axial control winding 6 is fed with a control current to generate an axial control magnetic field 4, and adjusts a bias magnetic field in the axial air gap to achieve axial levitation control of a rotating shaft. A radial control winding 8 is fed with a control current to generate a radial control magnetic field 9, and adjusts a bias magnetic field in the radial air gap to achieve radial levitation control of the rotating shaft, thereby achieving three-degree-of-freedom levitation of the rotating shaft. The structure of the three-degree-of-freedom magnetic bearing in the related technology has the following technical status: ① both the axial control winding 6 and the radial control winding 8 are mounted on the radial iron core 10, making it difficult to mount windings; ② the radial control winding 8 and the axial control winding 6 are arranged in a centralized manner, wire packages of which are too large, space occupation in an axial direction of the three-degree-of-freedom magnetic bearing becomes large, the rotating shaft becomes long, and the limit rotation speed is low; and ③ the magnetic field generated by the permanent magnet 2 and the axial control winding 6 is easily leaked between a magnetic conductive ring 7 and the axial iron core 5, and the axial bias magnetic field is uneven on left and right, so that the bearing output is limited and unstable.

SUMMARY

In the present disclosure, the technical problem to be solved is to overcome the defect of a magnetic bearing in the related art that an axial bias magnetic field generated by a permanent magnet is uneven on the left and right, so that a magnetic bearing, a compressor and an air conditioner are provided.

In order to solve the above problem, the present disclosure provides a magnetic bearing including:

an axial iron core, a permanent magnet, a magnetic conductive ring and a magnetic steel fixing frame. The permanent magnet includes a first permanent magnet located on a side of the magnetic conductive ring and a second permanent magnet located on another side of the magnetic conductive ring in an axial direction of the magnetic conductive ring, the first permanent magnet is located between the magnetic conductive ring and the axial iron core and is connected to the to the magnetic conductive ring and the axial iron core, and the second permanent magnet is located between the magnetic conductive ring and the axial iron core and is connected to the magnetic conductive ring and the axial iron core. The magnetic steel fixing frame is capable of fixing and supporting a radial inner side of the permanent magnet.

In some embodiments, the magnetic steel fixing frame includes a first magnetic steel fixing frame and a second magnetic steel fixing frame. The first magnetic steel fixing frame is capable of cooperating with the first permanent magnet to fix and support a radial inner side of the first permanent magnet, and the second magnetic steel fixing frame is capable of cooperating with the second permanent magnet to fix and support a radial inner side of the second permanent magnet.

In some embodiments, the magnetic steel fixing frame includes an annular body and a protruding portion. The protruding portion is arranged on a radial periphery of the annular body and protrudes outward in a radial direction of the annular body. The magnetic bearing includes a plurality of protruding portions. The plurality of protruding portions are arranged at intervals along a circumferential direction of the annular body, and an accommodating space is formed between two adjacent protruding portions. The magnetic bearing includes a plurality of permanent magnets. The plurality of permanent magnets are arranged at intervals along the circumferential direction. Each permanent magnet is arranged in a one-to-one correspondence with the accommodating space.

In some embodiments, the protruding portion is provided with a fixing frame mounting hole which penetrates through both axial ends of the protruding portion in an axial direction of the annular body, and the protruding portion is capable of being fixed to the magnetic conductive ring by the fixing frame mounting hole.

In some embodiments, the magnetic bearing further includes a bearing rotor and a radial iron core. The axial iron core is in a concave shape in a radial cross section. The radial iron core, the permanent magnet, and the magnetic conductive ring are all located in a space surrounded by the axial iron core. The bearing rotor is located at an indentation on a radial inner side of the axial iron core. The radial iron core is located on a radial outer side of the bearing rotor, and the magnetic conductive ring is located on a radial outer side of the radial iron core.

In some embodiments, the magnetic bearing further includes a radial control winding and an axial control winding. The radial control winding is wound on the radial iron core, and the axial control winding is located on a radial outer side of the magnetic conductive ring.

In some embodiments, the magnetic bearing further includes an axial winding skeleton, which is arranged on a radial periphery of the magnetic conductive ring. The axial winding skeleton has an annular structure, and a radial periphery of the axial winding skeleton is provided with an annular groove that is provided with an opening outward in a radial direction of the axial winding skeleton, and the axial control winding is arranged in the annular groove.

In some embodiments, the magnetic bearing further includes an axial skeleton support ring, which is arranged on a radial periphery of the magnetic conductive ring. The axial winding skeleton includes a first axial winding skeleton and a second axial winding skeleton. The first axial winding skeleton is connected to an axial end of the axial skeleton support ring, and the second axial winding skeleton is connected to another axial end of the axial skeleton support ring, to support the first axial winding skeleton and the second axial winding skeleton by the axial skeleton support ring. An axial control winding is wound on each of the first axial winding skeleton and the second axial winding skeleton.

In some embodiments, the axial skeleton support ring is provided with an axial skeleton mounting hole which penetrates through both axial end faces of the axial skeleton support ring. The first axial winding skeleton is provided with a first protruding portion, and the second axial winding skeleton is provided with a second protruding portion. The first protruding portion faces the axial skeleton mounting hole and is capable of being inserted into the axial skeleton mounting hole. The second protruding portion faces the axial skeleton mounting hole and is capable of being inserted into the axial skeleton mounting hole.

In some embodiments, a countersunk hole is provided at a top of the first protruding portion in a direction away from the second protruding portion, and the second protruding portion is capable of being inserted into the countersunk hole after being inserted into and passing through the axial skeleton mounting hole.

In some embodiments, an annular protruding portion is provided on an outer peripheral surface of the magnetic conductive ring. A first step is formed at an axial end of the annular protruding portion, and a second step is formed at another axial end of the annular protruding portion. A radial inner periphery of the axial skeleton support ring further protrudes inward in a radial direction of the axial skeleton support ring to form a third step. The third step is engageable with the second step. The first axial winding skeleton is capable of abutting against an axial end of the axial skeleton support ring and/or against the first step, and the second axial winding skeleton is capable of abutting against another axial end of the axial skeleton support ring.

In some embodiments, the axial iron core includes a first axial iron core and a second axial iron core. The first axial iron core and the second axial iron core are distributed along an axial direction of the bearing rotor and are butted. An interior of the first axial iron core has a first cavity and an interior of 7 the second axial iron core has a second cavity. The first cavity and the second cavity are butted to form an accommodating cavity after the first axial iron core and the second axial iron core are butted. The permanent magnet, the magnetic conductive ring, the magnetic steel fixing frame, the bearing rotor and the radial iron core are all located in the accommodating cavity.

The present disclosure further provides a compressor, including the magnetic bearing described in any of the above embodiments.

The present disclosure further provides an air conditioner, including the above-mentioned compressor.

The magnetic bearing, compressor and air conditioner provided in the present disclosure have the following beneficial effects.

In the present disclosure, the permanent magnets of the magnetic bearing are provided to include the first permanent magnet located on a side of the magnetic conductive ring and the second permanent magnet located on another side of the magnetic conductive ring in an axial direction of the magnetic conductive ring. A segmented permanent magnet arrangement is formed, so that a bias magnetic field on an axial side is provided by the first permanent magnet, and a bias magnetic field on another axial side is provided by the second permanent magnet. This arrangement allows the bias magnetic fields on both axial sides are respectively provided by two independent permanent magnets, so that the bias magnetic field will not fluctuate due to a decrease in gaps, thereby making the bias magnetic fields on both axial sides more uniform.

BRIEF DESCRIPTION OF THE DRAWINGS

The drawings described herein are used to provide a further understanding of the present disclosure and constitute a part of the present disclosure. The illustrative embodiments of the present disclosure and their descriptions are used to explain the present disclosure and do not constitute an improper limitation on the present disclosure. The drawings including the follows.

THE REFERENCE NUMERALS INCLUDE

Figure 1:
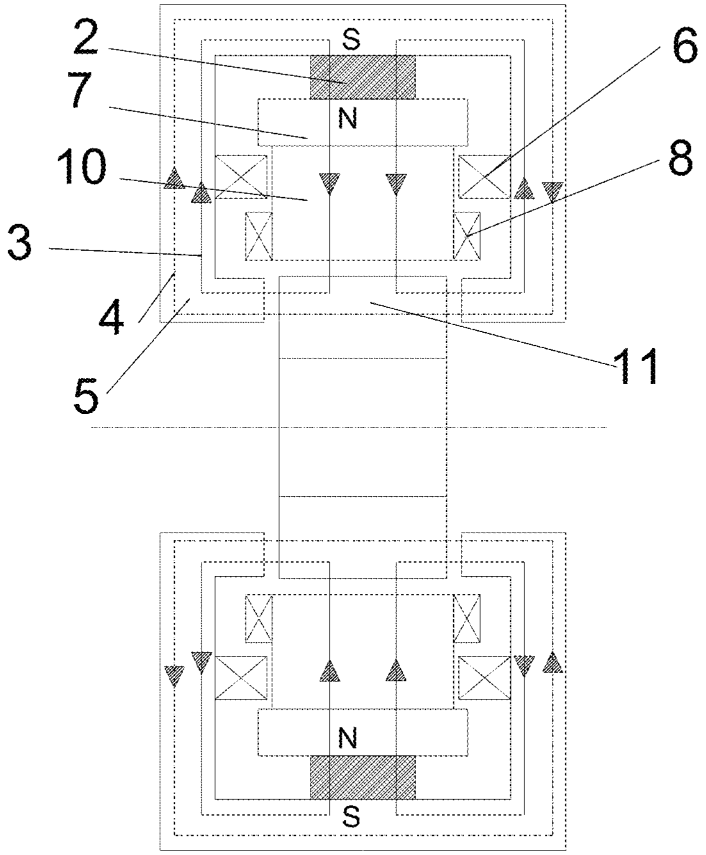
FIG. 1 is a sectional view in a radial direction illustrating a three-degree-of-freedom magnetic bearing of the related art.
Figure 1A:
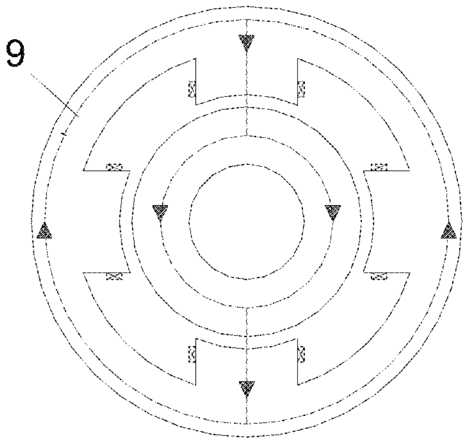
FIG. 1*a* is a sectional view in an axial direction in FIG. 1.
Figure 2:
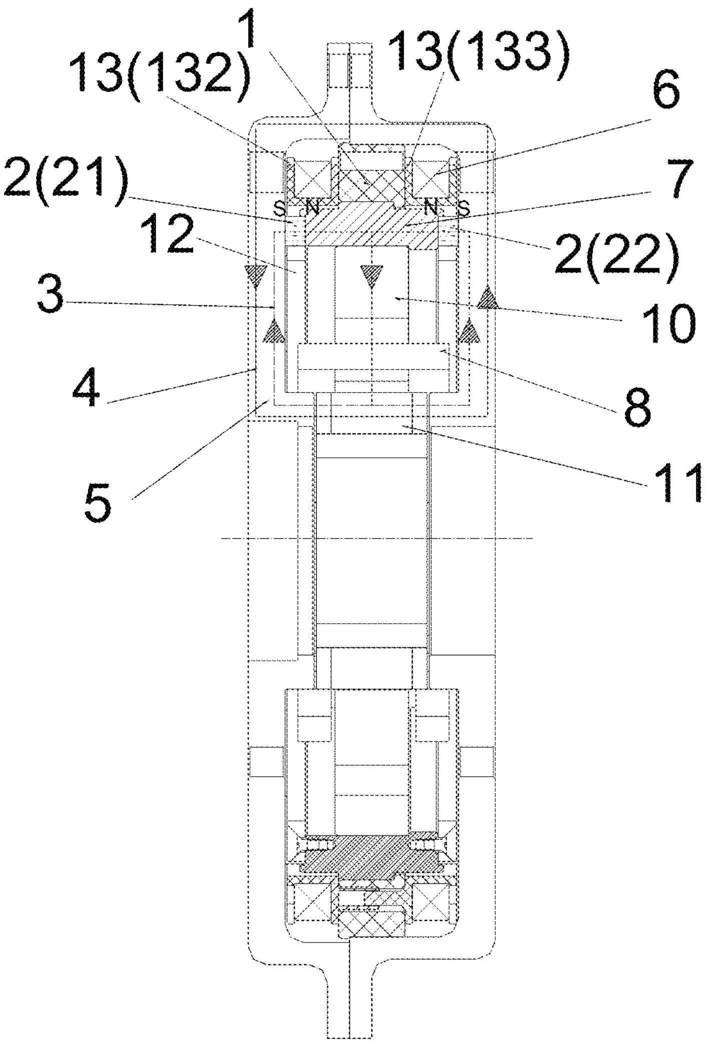
FIG. 2 is a sectional view in a radial direction illustrating a three-degree-of-freedom magnetic bearing in the present disclosure.
Figure 2A:
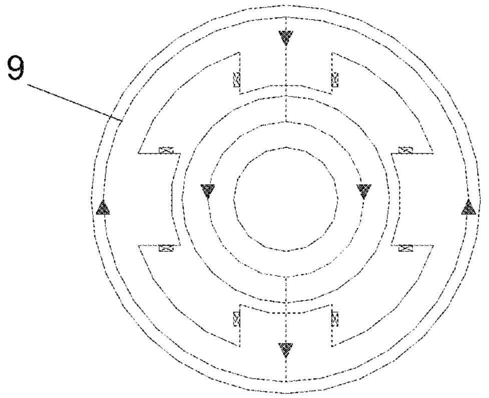
FIG. 2*a* is sectional view in an axial direction in FIG. 2.
Figure 3:
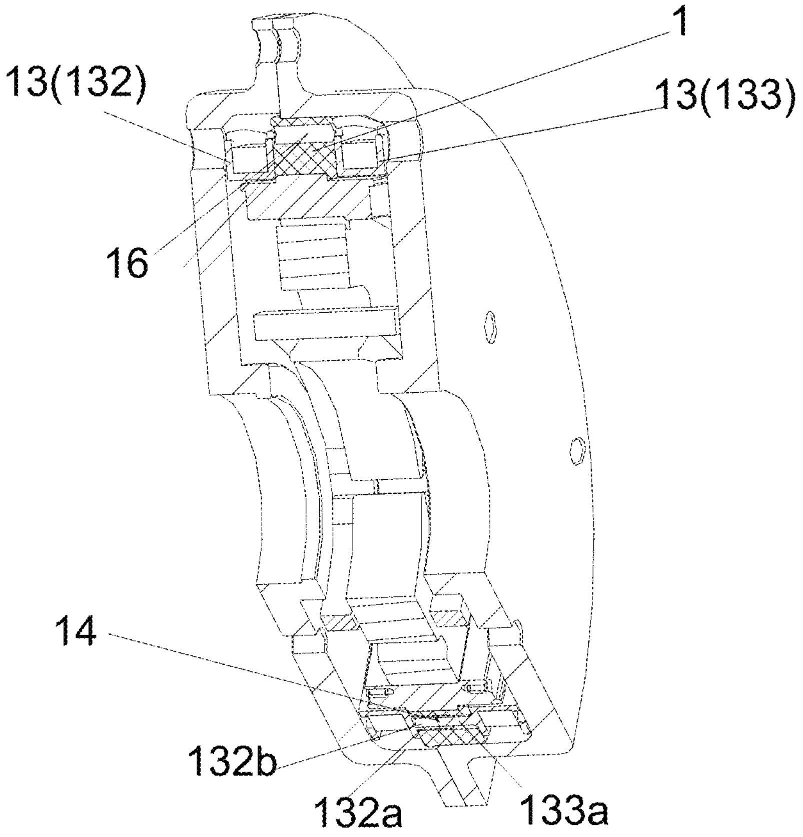
FIG. 3 is a partial sectional view illustrating an axial winding skeleton and an axial skeleton support ring of a magnetic bearing in the present disclosure.
Figure 3A:
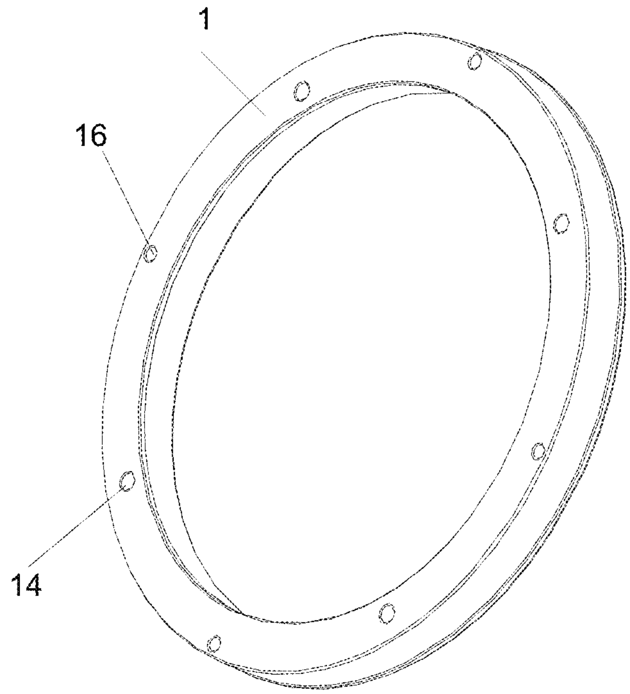
FIG. 3*a* is a diagram illustrating a three-dimensional structure of an axial skeleton support ring in FIG. 3.
Figure 3B:
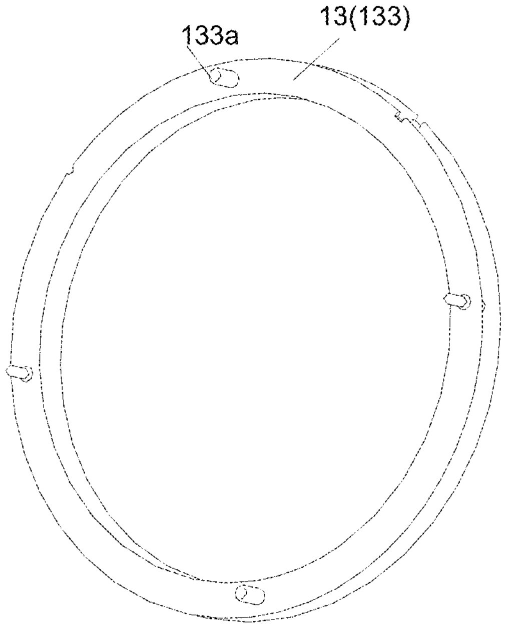
FIG. 3*b* is a diagram illustrating a three-dimensional structure of an axial winding skeleton in FIG. 3.
Figure 4:
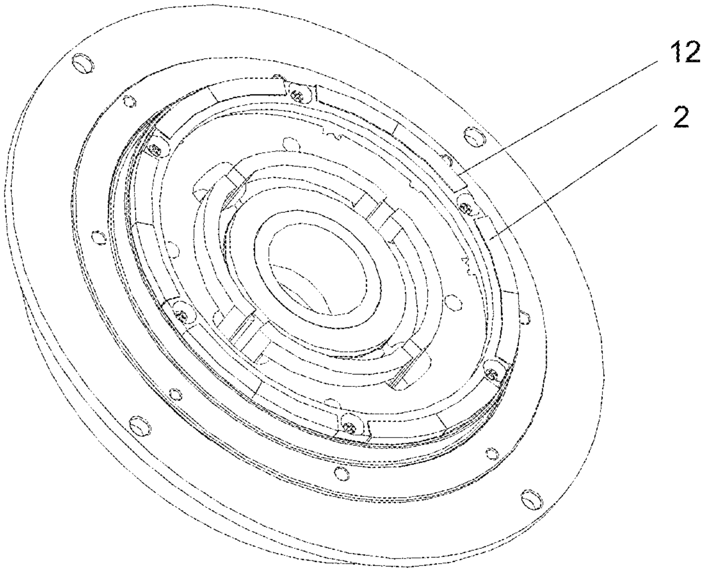
FIG. 4 is a partial view illustrating a structure of a permanent magnet and a magnetic steel fixing frame of a magnetic bearing in the present disclosure.
Figure 4A:
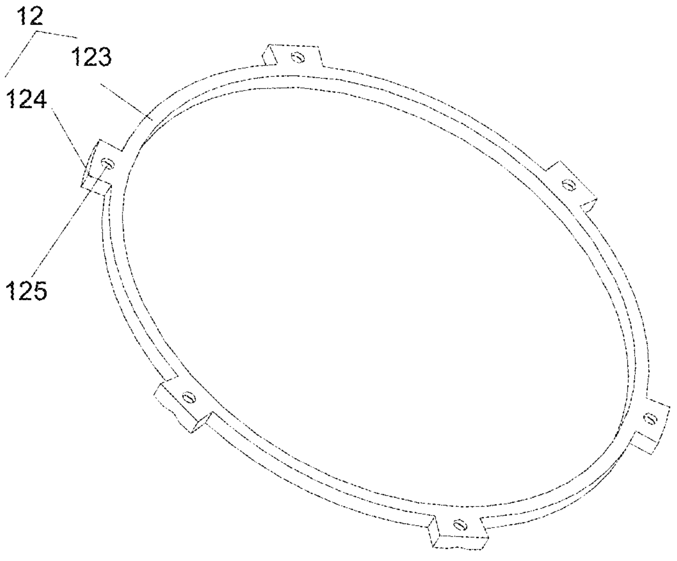
FIG. 4*a* is a diagram illustrating a three-dimensional structure of a magnetic steel fixing frame in FIG. 4.

1-Axial skeleton support ring; 2-Permanent magnet; 21-First permanent magnet; 22-Second permanent magnet; 3-Radial-axial bias magnetic field; 4-Axial control magnetic field; 5-Axial iron core; 51-First axial iron core; 52-Second axial iron core; 6-Axial control winding; 7-Magnetic conductive ring; 71-Annular protruding portion; 72-First step; 73-Second step; 8-Radial control winding; 9-Radial control magnetic field; 10-Radial iron core; 11-Bearing rotor; 12-Magnetic Steel fixing frame; 121-first magnetic steel fixing frame; 122-second magnetic steel fixing frame; 123-annular body; 124-protruding portion; 125-fixing frame mounting hole; 13-axial winding skeleton; 131-annular groove; 132-first axial winding skeleton; 132*a*-first protruding portion; 132*b*-countersunk hole; 133-second axial winding skeleton; 133*a*-second protruding portion; 14-axial skeleton mounting hole; 15-third step; and 16-axial winding crossing hole.

DETAILED DESCRIPTION OF THE EMBODIMENTS

In order to make the purpose, technical solutions and advantages of the present disclosure clearer, technical solutions of the present disclosure will be clearly and completely described below in combination with specific embodiments of the present disclosure and the corresponding drawings. Obviously, the described embodiments are only part of the embodiments of the present disclosure, not all of the embodiments. Based on the embodiments in the present disclosure, all other embodiments obtained by ordinary technicians in this field without making creative efforts are within the scope of the present disclosure.

With reference to FIG. 2 to FIG. 6, the present disclosure provides a magnetic bearing, including:

an axial iron core 5, a permanent magnet 2, a magnetic conductive ring 7 and a magnetic steel fixing frame 12. The permanent magnet 2 includes a first permanent magnet 21 located on a side of the magnetic conductive ring 7 and a second permanent magnet 22 located on another side of the magnetic conductive ring 7 in an axial direction of the magnetic conductive ring 7. The first permanent magnet 21 is located between the magnetic conductive ring 7 and the axial iron core 5 and is connected to the magnetic conductive ring 7 and the axial iron core 5. The second permanent magnet 22 is located between the magnetic conductive ring 7 and the axial iron core 5 and is connected to the magnetic conductive ring 7 and the axial iron core 5. The magnetic steel fixing frame 12 is capable of fixing and supporting a radial inner side of the permanent magnet 2.

In the present disclosure, the permanent magnets of the magnetic bearing are provided to include the first permanent magnet located on a side of the magnetic conductive ring and the second permanent magnet located on another side of the magnetic conductive ring in an axial direction of the magnetic conductive ring. A segmented permanent magnet arrangement is formed, so that a bias magnetic field on an axial side is provided by the first permanent magnet, and a bias magnetic field on another axial side is provided by the second permanent magnet. This arrangement allows the bias magnetic fields on both axial sides are respectively provided by two independent permanent magnets, so that the bias magnetic field will not fluctuate due to a decrease in gaps, thereby making the bias magnetic fields on both axial sides more uniform. The radial inner side of segmented permanent magnet can also be fixed and supported by the magnetic steel fixing frame, thereby improving effects of supporting, fixing and positioning on the segmented permanent magnets. The bias magnetic field can be further stabilized, the distribution of the bias magnetic field can be more uniform, and output load of the magnetic bearing in an axial direction can be stable. Further, the first permanent magnet and the second permanent magnet are respectively connected to the magnetic conductive ring and the axial iron core, the permanent magnet is located between the magnetic conductive ring 7 and the iron core, the bias magnetic field directly passes through the permanent magnet to form a backflow, to prevent a leakage magnetic field due to gaps between the permanent magnet and the axial iron core, and the leakage magnetic field between the bias magnetic field and an axial control magnetic field, unevenness of the axial bias magnetic field, and instability of bearing output can be prevented.

In order to solve problems of the difficulty in mounting radial and axial control windings, large space occupation in an axial direction, the leakage magnetic field, and an uneven magnetic field in three-degree-of-freedom magnetic bearing in the related art, a new structure of the three-degree-of-freedom magnetic bearing is provided in the present disclosure.

As shown in FIG. 2 to FIG. 5, the three-degree-of-freedom magnetic bearing has a radial-axial bias magnetic field 3 generated by the permanent magnets on the left and right sides, which generates a bias magnetic field in an air gap among the axial iron core 5, the radial iron core 10 and the bearing rotor 11. An axial control winding 6 is fed with a control current to generate an axial control magnetic field 4, which adjusts the bias magnetic flux in the axial air gap to achieve axial levitation control of the rotating shaft. A radial control winding 8 is fed with a control current to generate a radial control magnetic field 9, which adjusts the bias magnetic flux in the radial air gap to achieve radial levitation control of the rotating shaft. The axial control winding 6 and the radial control winding 8 are assembled separately, which can effectively solve problems that the axial control winding and the radial control winding are difficult to be mounted due to a large winding volume, and current situations that space occupation in an axial direction of three-degree-of-freedom magnetic bearing is large, has a long length of the rotating shaft, and has a low limiting speed. An axial skeleton support ring 1 assists in mounting and fixation of the axial control winding 6, adopts non-magnetic material and segmented permanent magnets, which can solve problems of that the axial control magnetic field generated by the permanent magnet 2 and the axial control winding 6 generates a leakage magnetic field between the magnetic conductive ring 7 and the axial iron core 5, and unevenness of the axial bias magnetic field on the left and right.

In the present disclosure, a three-degree-of-freedom magnetic bearing is provided to solve following technical problems:

1. the left and right bias magnetic fields are uneven, the axial control magnetic field leaks between the magnetic conductive ring and the axial iron core, and the bearing output is limited and unstable;
2. the axial control winding is integrated with the radial control winding, resulting in a large winding volume, and difficulties in mounting of the axial control winding and the radial control winding; and 3. a space occupation in an axial direction of the three-degree-of-freedom magnetic bearing is large, the rotating shaft is long, and limit rotation speed is low. Beneficial effects are as follows:

1. according to a structure of the axial skeleton support ring 1 and the magnetic steel fixing frame 12 of the magnetic bearing as shown in FIG. 2 to FIG. 5, segmented permanent magnet 2 is applied, which has beneficial effects including: a structure of the magnetic steel fixing frame 12 assists mounting of a structure of the segmented permanent magnet 2, the axial skeleton support ring 1 adopts a non-magnetic material, and segmented permanent magnet 1 can provide an axial bias magnetic field to front and rear axial bearings respectively, to jointly provide a radial bias magnetic field to the radial bearing, which can prevent a leakage magnetic field between the bias magnetic field and the axial control magnetic field, unevenness of the axial bias magnetic field, and instability of bearing output; and
2. according to a structure of the axial winding skeleton 13 and the axial skeleton support ring 1 of the magnetic bearing as shown in FIG. 2 to FIG. 5, the axial control winding 6 is designed to be separate from the radial control winding 8, which has beneficial effects including: in an axial direction, it is only relied on that magnetically isolated axial skeleton support ring 1 and the axial winding crossing hole 16 on the axial iron core 5 lead, and the axial winding skeleton is fixed on the axial skeleton mounting hole 14 of support ring, so that the axial control winding 6 and the radial control winding 8 are easy to be mounted, the winding volume is reduced, the space occupation in an axial direction of the three-degree-of-freedom magnetic bearing is small, the length of the rotating shaft is short, and the limit rotation speed is high.

In the three-degree-of-freedom magnetic bearing provided by the present disclosure:

1. according to a structure of the three-degree-of-freedom magnetic bearing, the axial bias magnetic field generated by the segmented permanent magnet is uniformly distributed, output load of the magnetic bearing in an axial direction is stable, the radial and axial control windings are easy to be mounted, the magnetic levitation system occupies a small space in an axially direction, the length of the rotating shaft is short, and limit rotation speed is high;
2. according to a structure of the magnetic steel fixing frame and the non-magnetic material of the axial skeleton support ring, the segmented permanent magnet can effectively solve current situations of a leakage magnetic field between the magnetic conductive ring and the axial iron core, uneven axial bias magnetic field generated by the bias magnetic field and the axial control magnetic field, and instability of bearing output; and
3. according to structures of the axial winding skeleton and the magnetically isolated axial skeleton support ring, a separate design of the axial control winding and the radial control winding is realized, which can effectively solve problems of excessive volume at mounting of windings in an axial direction, difficulty in mounting the radial and axial control windings, large space occupation in an axial direction of the structure of the three-degree-of-freedom magnetic bearing, long length of the rotating shaft, and low limit rotation speed.

In some embodiments, the magnetic steel fixing frame 12 includes a first magnetic steel fixing frame 121 and a second magnetic steel fixing frame 122. The first magnetic steel fixing frame 121 is capable of cooperating with the first permanent magnet 21 to fix and support a radial inner side of the first permanent magnet 21, and the second magnetic steel fixing frame 122 is capable of cooperating with the second permanent magnet 22 to fix and support a radial inner side of the second permanent magnet 22. The magnetic steel fixing frame includes a first magnetic steel fixing frame that cooperates with the first permanent magnet on an axial side, and a second magnetic steel fixing frame that cooperates with the second permanent magnet on another axial side, which can respectively play a role of positioning and fixing support for both the first permanent magnet and the second permanent magnet, to further stabilize the bias magnetic field, make magnetic field distribution more uniform, and make the output load of the magnetic bearing in an axial direction more stable.

In some embodiments, the magnetic steel fixing frame 12 includes an annular body 123 and a protruding portion 124. The protruding portion 124 is arranged on a radial periphery of the annular body 123 and protrudes outward in a radial direction of the annular body 123. The magnetic bearing includes a plurality of protruding portions 124. The plurality of the protruding portions 124 are arranged at intervals along a circumferential direction of the annular body 123, and an accommodating space is formed between two adjacent protruding portions 124. The magnetic bearing includes a plurality of permanent magnets 2 and the plurality of permanent magnets 2 are arranged at intervals along the circumferential direction. Each permanent magnet is clamped in a one-to-one correspondence with the accommodating space. An inner perimeter of the permanent magnet is supported by the annular body through the periphery of the annular body, and the accommodating space is formed by arrangement of the protruding portion, to clamp both sides of the permanent magnet in a circumferential direction, thereby further playing an effective role in fixing the permanent magnet, improving a stabilization effect on the permanent magnet, and further improving stability of the bias magnetic field to make the bias magnetic field distribution more uniform.

In some embodiments, the protruding portion 124 is provided with a fixing frame mounting hole 125 which penetrates through both axial ends of the protruding portion 124 in an axial direction of the annular body 123, and the protruding portion 124 is capable of being fixed to the magnetic conductive ring 7 by the fixing frame mounting hole 125. In the present disclosure, the magnetic steel fixing frame is fixed to the magnetic conductive ring by inserting fasteners such as screws through the fixing frame mounting hole provided on the protruding portion, thereby firmly fixing and limiting the permanent magnet through the magnetic steel fixing frame, thereby ensuring stability and uniformity of the bias magnetic field.

In some embodiments, the magnetic bearing further includes a bearing rotor 11 and a radial iron core 10. The axial iron core 5 is in a concave shape (C-shaped) in a radial cross section. The radial iron core 10, the permanent magnet 2, and the magnetic conductive ring 7 are all located in a space surrounded by the axial iron core 5. The bearing rotor 11 is located at an indentation on a radial inner side of the axial iron core 5. The radial iron core 10 is located on a radial outer side of the bearing rotor 11. The magnetic conductive ring 7 is located on a radial outer side of the radial iron core 10. The axial iron core surrounds a space to accommodate structures such as the radial iron core, the bearing rotor, etc.

In some embodiments, the magnetic bearing further includes a radial control winding 8 and an axial control winding 6. The radial control winding 8 is wound on the radial iron core 10, and the axial control winding 6 is located on a radial outer side of the magnetic conductive ring 7. In the present disclosure, the radial control winding and the axial control winding are arranged at different positions, thereby effectively reducing space occupation in an axial direction compared to the related art in which both the radial control winding and the axial control winding are arranged on the radial iron core, thereby effectively reducing a space in the axial direction and making the structure more compact.

In some embodiments, the magnetic bearing further includes an axial winding skeleton 13. The axial winding skeleton 13 is arranged on a radial periphery of the magnetic conductive ring 7. The axial winding skeleton 13 has an annular structure, and a radial periphery of the axial winding skeleton 13 is provided with an annular groove 131 that is provided with an opening outward in a radial direction of the axial winding skeleton 13. The axial control winding 6 is arranged in the annular groove 131. In the present disclosure, the axial control winding can be effectively supported by arrangement of the axial winding skeleton, and it is effectively ensured that the axial control winding and the radial control winding are respectively located on the radial periphery and the radial inner side of the magnetic conductive ring, which effectively reduces space occupation and reduces a space occupancy rate.

In some embodiments, the magnetic bearing further includes an axial skeleton support ring 1. The axial skeleton support ring 1 is arranged on a radial periphery of the magnetic conductive ring 7. The axial winding skeleton 13 includes a first axial winding skeleton 132 and a second axial winding skeleton 133. The first axial winding skeleton 132 is connected to an axial end of the axial skeleton support ring 1, and the second axial winding skeleton 133 is connected to another axial end of the axial skeleton support ring 1, to support the first axial winding skeleton 132 and the second axial winding skeleton 133 by the axial skeleton support ring 1. An axial control winding 6 is wound on each of the first axial winding skeleton 132 and the second axial winding skeleton 133.

In the present disclosure, a separate design of the axial control winding and the radial control winding is realized by a structure of the axial winding skeleton and the axial skeleton support ring, so that the axial control winding and radial control winding do not have to be arranged on the radial iron core. If the axial control winding and radial control winding are arranged on the radial iron core, two axial control windings have to be mounted on a side of the magnetic conductive ring, making a space very narrow. The separate design can make an axial span/space of the magnetic bearing very large, and the volume very large. The axial control winding of the present disclosure is arranged on the radial outer side of the magnetic conductive ring, and the radial control winding is arranged on the radial inner side of the magnetic conductive ring, which can shorten a length in an axial direction and reduce volume of the magnetic bearing. The radial and axial control windings are easy to be mounted, space occupation in an axial direction of the magnetic levitation system is small, the length of the rotating shaft is short, and the limit rotation speed is high.

In some embodiments, the axial skeleton support ring 1 is provided with an axial skeleton mounting hole 14 which penetrates through both axial end faces of the axial skeleton support ring 1. The first axial winding skeleton 132 is provided with a first protruding portion 132*a*, and the second axial winding skeleton 133 is provided with a second protruding portion 133*a*. The first protruding portion 132*a* faces the axial skeleton mounting hole 14 and is capable of being inserted into the axial skeleton mounting hole 14. The second protruding portion 133*a* faces the axial skeleton mounting hole 14 and is capable of being inserted into the axial skeleton mounting hole 14. In the present disclosure, according to the axial skeleton mounting hole, the first protruding portion, and the second protruding portion, two protruding portions are capable of being inserted into the axial skeleton mounting hole, and the axial skeleton support ring plays a role in effectively fixing and supporting two axial winding skeletons.

In some embodiments, a countersunk hole 132*b* is provided at a top of the first protruding portion 132*a* in a direction away from the second protruding portion 133*a*, and the second protruding portion 133*a* is capable of being inserted into the countersunk hole 132*b* after being inserted into and passing through the axial skeleton mounting hole 14. In the present disclosure, according to the countersunk hole provided on the first protruding portion, the second protruding portion is capable of being further inserted into the countersunk hole (preferably by interference fit) after being inserted into and passing through the axial skeleton mounting hole, thereby further enhancing fixing effect of two axial winding frameworks.

In some embodiments, an annular protruding portion 71 is provided on an outer peripheral surface of the magnetic conductive ring 7. a first step 72 is formed at an axial end of the annular protruding portion 71, and a second step 73 is formed at another axial end of the annular protruding portion 71. A radial inner periphery of the axial skeleton support ring 1 further protrudes inward in a radial direction of the axial skeleton support ring 1 to form a third step 15. The third step 15 is engageable with the second step 73. The first axial winding skeleton 132 is capable of abutting against an axial end of the axial skeleton support ring 1 and/or against the first step 72. The second axial winding skeleton 133 is capable of abutting against another axial end of the axial skeleton support ring 1. In the present disclosure, according to the annular protruding portions provided on the magnetic conductive ring, the first step and the second step are formed, and the radial inner periphery of the axial skeleton support ring protrudes to form the third step, so that the third step is snap-fitted with the second step, thereby being able to act as an axial limit on the axial skeleton support ring by the second step. The first winding skeleton and the second axial winding skeleton abut against the end faces of the axial skeleton support ring respectively, and it is finally realized that two axial winding skeletons are axially limited and positioned.

In some embodiments, the axial iron core 5 includes a first axial iron core 51 and a second axial iron core 52. The first axial iron core 51 and the second axial iron core 52 are distributed and butted along an axial direction of the bearing rotor 11. An interior of the first axial iron core 51 has a first cavity, and an interior of the second axial iron core 52 has a second cavity. The first cavity and the second cavity are butted to form an accommodating cavity after the first axial iron core 51 and the second axial iron core 52 are butted. The permanent magnet 2, the magnetic conductive ring 7, the magnetic steel fixing frame 12, the bearing rotor 11 and the radial iron core 10 are all located in the accommodating cavity. In the present disclosure, a separate design of the axial iron core is adopted, so that all components can be assembled inside an accommodating cavity surrounded by two axial iron cores to form a complete product structure of the magnetic bearing, which can be applied to different rotating shafts for magnetic levitation support.

Figure 5:
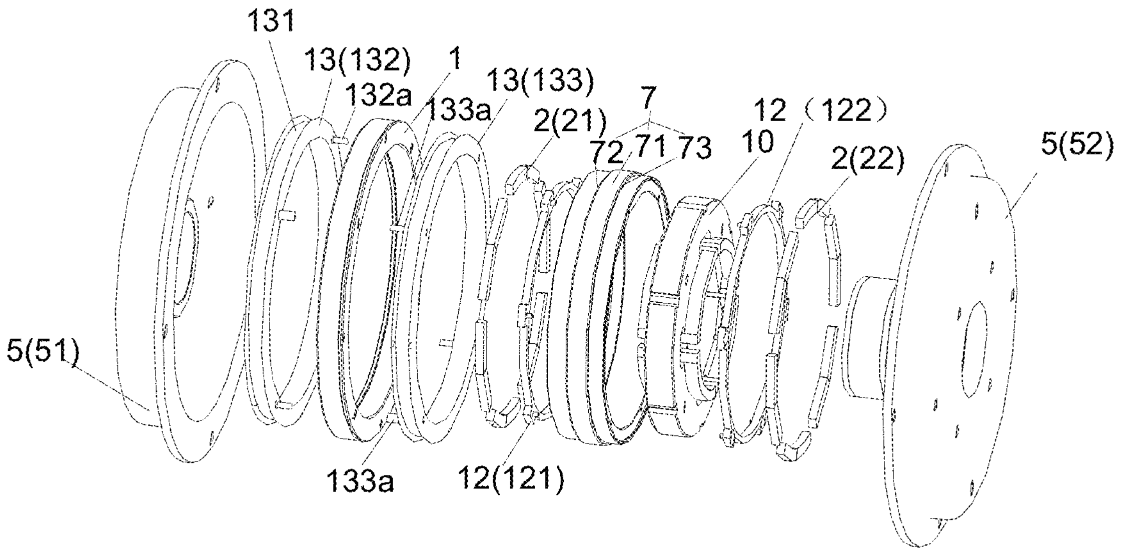
FIG. 5 is a schematic diagram illustrating an exploded structure of a magnetic bearing in the present disclosure.
Figure 5A:
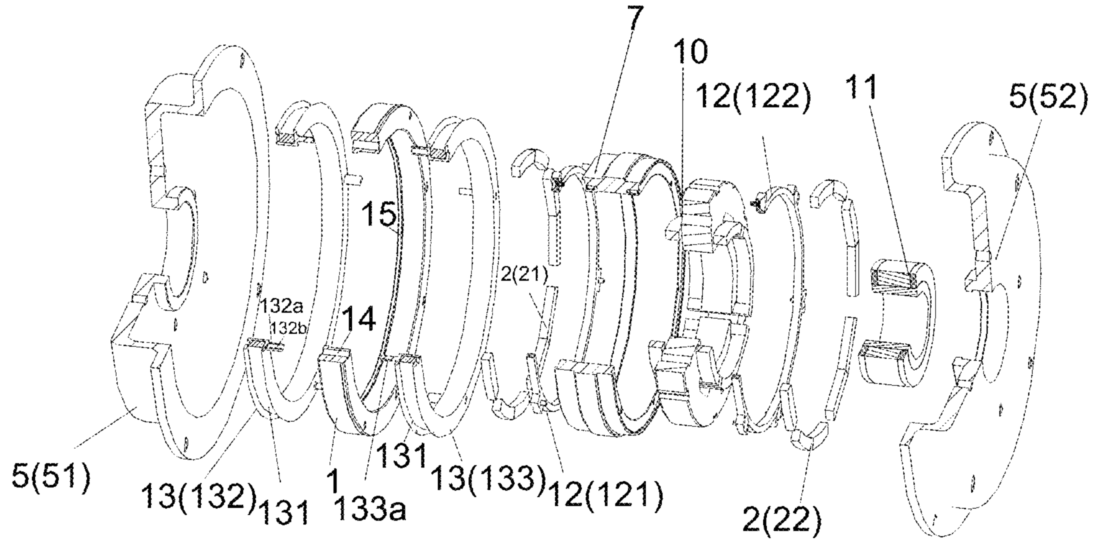
FIG. 5*a* is a sectional diagram illustrating a structure of components in FIG. 5.

As shown in FIG. 5, the radial control winding 8 is embedded in the radial iron core 10, and the radial control winding 8 is fixedly mounted by shaping and dipping paint to form a radial bearing assembly. The radial bearing assembly is thermally sleeved in the magnetic conductive ring 7, and is closely fitted with an inner wall boss of the magnetic conductive ring 7. After the magnetic conductive ring 7 is cooled, the radial bearing assembly is fixedly mounted. The magnetic steel fixing frame 12 is mounted on both sides of the magnetic conductive ring 7 by screws, and the permanent magnet 2 is adhered to both sides of the magnetic conductive ring 7 by strong glue. The magnetic steel fixing frame 12 assists the magnetic conductive ring 7 in being fixedly mounted to form a total radial bearing assembly. The axial control winding 6 is wound on an inner side of the axial winding skeleton 13 to form front and rear axial winding assemblies. The front and rear axial winding assemblies are respectively mounted on both sides of the axial skeleton support ring 1, and the front and rear axial winding assemblies are integrated with the axial skeleton support ring 1 by a boss buckle and dipping paint process on the axial winding skeleton 13 to form a total axial winding. A front axial iron core (i.e. the first axial iron core 51) is heated, and is inserted into the total axial winding and the total radial bearing assembly in sequence. There is a step positioning in an inner side of the front axial iron core, and the total axial winding is closely fitted with the step to achieve fixed mounting.

There is a step positioning in an inner side of the axial skeleton support ring, and the total radial bearing assembly is closely fitted with the step to achieve fixed mounting by screw locking. A three-degree-of-freedom front bearing assembly is formed. The three-degree-of-freedom front bearing assembly, the bearing rotor assembly, and a rear axial iron core (i.e. the second axial iron core 52) are sequentially assembled into the compressor to form a three-degree-of-freedom magnetic bearing, so that three-degree-of-freedom levitation control of the rotating shaft is achieved.

Figure 6:
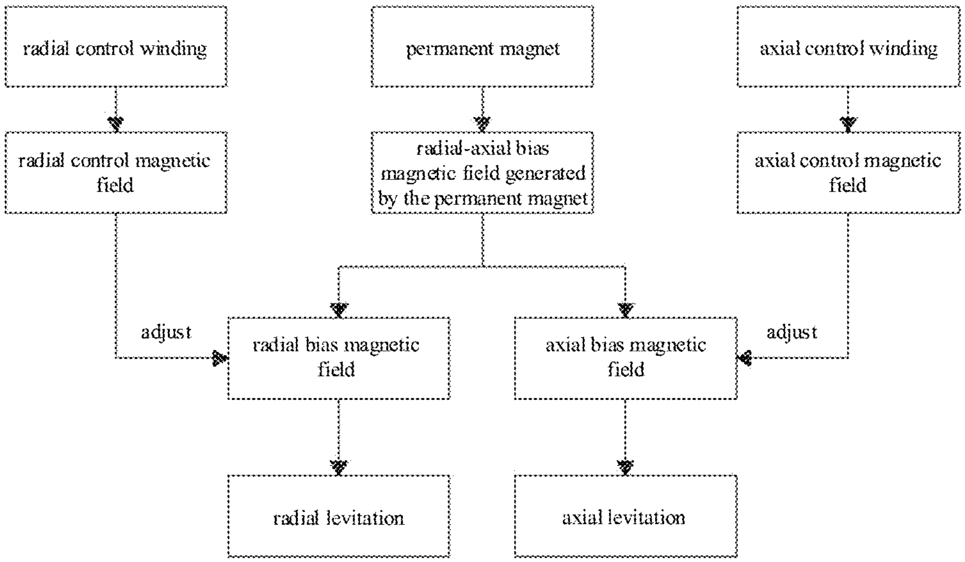
FIG. 6 is a diagram illustrating control logic of the three-degree-of-freedom magnetic bearing in the present disclosure.

A control logic of the three-degree-of-freedom magnetic bearing provided in the present disclosure is as shown in FIG. 6.

The permanent magnet generates an axial-radial bias magnetic field, forming a bias magnetic field strength in radial and axial air gaps respectively. When the rotating shaft is located at a center, the magnetic field strengths in the symmetrical radial and axial air gaps of the magnetic bearing are the same, and the rotating shaft is stably levitated. When the rotating shaft deviates from the center in a radial direction, the magnetic field strengths in symmetrical radial air gaps of the magnetic bearing are different, and the rotating shaft continues to deviate in a radial direction until it becomes unstable. A radial control winding is required to generate a radial control magnetic field to adjust the magnetic field strength of the radial air gaps, so that the rotating shaft is deviated in the opposite direction until it reaches the center, thereby achieving stable radial levitation. According to a same axial control logic, stable levitation of the three-degree-of-freedom magnetic bearing is achieved.

A compressor is provided in the present disclosure, including the aforementioned magnetic bearing.

An air conditioner is further provided in the present disclosure, including the above-mentioned compressor.

It is easy for those skilled in the art to understand that, under the premise of no conflict, the above-mentioned advantageous ways can be freely combined and superimposed.

The above specific embodiments are only preferred embodiments of the present disclosure and are not intended to limit the present disclosure. Any modifications, equivalent replacements and improvements made without departing from the connotation of the present disclosure should be included in the scope of the present disclosure. The above are only preferred implementations of the present disclosure. It should be pointed out that for ordinary technicians in this technical field, several improvements and variations can be made without departing from the technical connotation of the present disclosure, and these improvements and variations should also be regarded as the scope of the present disclosure.

The invention claimed is:

1. A magnetic bearing, comprising:

an axial iron core, a permanent magnet, a magnetic conductive ring and a magnetic steel fixing frame, wherein the permanent magnet comprises a first permanent magnet located on a side of the magnetic conductive ring and a second permanent magnet located on another side of the magnetic conductive ring in an axial direction of the magnetic conductive ring, the first permanent magnet is located between the magnetic conductive ring and the axial iron core and is connected to the magnetic conductive ring and the axial iron core, and the second permanent magnet is located between the magnetic conductive ring and the axial iron core and is connected to the magnetic conductive ring and the axial iron core, wherein the magnetic steel fixing frame is capable of fixing and supporting a radial inner side of the permanent magnet, and wherein the magnetic steel fixing frame comprises an annular body and a protruding portion, the protruding portion is arranged on a radial periphery of the annular body and protrudes outward in a radial direction of the annular body.

2. The magnetic bearing of claim 1, wherein:

the magnetic steel fixing frame comprises a first magnetic steel fixing frame and a second magnetic steel fixing frame, the first magnetic steel fixing frame is capable of cooperating with the first permanent magnet to fix and support a radial inner side of the first permanent magnet, and the second magnetic steel fixing frame is capable of cooperating with the second permanent magnet to fix and support a radial inner side of the second permanent magnet.

3. The magnetic bearing of claim 1, wherein:

the protruding portion is provided with a fixing frame mounting hole which penetrates through both axial ends of the protruding portion in an axial direction of the annular body, and the protruding portion is capable of being fixed to the magnetic conductive ring by the fixing frame mounting hole.

4. The magnetic bearing of claim 1, further comprising:

a bearing rotor and a radial iron core, wherein the axial iron core is in a concave shape in a radial cross section, the radial iron core, the permanent magnet, and the magnetic conductive ring are all located in a space surrounded by the axial iron core.

5. The magnetic bearing of claim 4, further comprising: a radial control winding and an axial control winding, wherein the radial control winding is wound on the radial iron core, and the axial control winding is located on a radial outer side of the magnetic conductive ring.

6. The magnetic bearing of claim 5, further comprising: an axial winding skeleton, wherein the axial winding skeleton is arranged on a radial periphery of the magnetic conductive ring, the axial winding skeleton has an annular structure, a radial outer periphery of the axial winding skeleton is provided with an annular groove that is provided with an opening outward in a radial direction of the axial winding skeleton, and the axial control winding is arranged in the annular groove.

7. The magnetic bearing of claim 6, further comprising: an axial skeleton support ring, wherein: the axial skeleton support ring is arranged on a radial periphery of the magnetic conductive ring, the axial winding skeleton comprises a first axial winding skeleton and a second axial winding skeleton, the first axial winding skeleton is connected to an axial end of the axial skeleton support ring, and the second axial winding skeleton is connected to another axial end of the axial skeleton support ring, to support the first axial winding skeleton and the second axial winding skeleton by the axial skeleton support ring.

8. The magnetic bearing of claim 7, wherein: the axial skeleton support ring is provided with an axial skeleton mounting hole which penetrates through both axial end faces of the axial skeleton support ring, the first axial winding skeleton is provided with a first protruding portion, the second axial winding skeleton is provided with a second protruding portion, the first protruding portion faces the axial skeleton mounting hole and is capable of being inserted into the axial skeleton mounting hole, and the second protruding portion faces the axial skeleton mounting hole and is capable of being inserted into the axial skeleton mounting hole.

9. The magnetic bearing of claim 8, wherein: a countersunk hole is provided at a top of the first protruding portion in a direction away from the second protruding portion, and the second protruding portion is capable of being inserted into the countersunk hole after being inserted into and passing through the axial skeleton mounting hole.

10. The magnetic bearing of claim 7, wherein: an annular protruding portion is provided on an outer peripheral surface of the magnetic conductive ring, a first step is formed at an axial end of the annular protruding portion, a second step is formed at another axial end of the annular protruding portion, a radial inner periphery of the axial skeleton support ring further protrudes inward in a radial direction of the axial skeleton support ring to form a third step, and the third step is engageable with the second step.

11. The magnetic bearing of claim 10, wherein the first axial winding skeleton is capable of abutting against an axial end of the axial skeleton support ring and/or against the first step, and the second axial winding skeleton is capable of abutting against another axial end of the axial skeleton support ring.

12. The magnetic bearing of claim 7, wherein the axial control winding is wound on each of the first axial winding skeleton and the second axial winding skeleton.

13. The magnetic bearing of claim 7, wherein the axial skeleton support ring is made of a non-magnetic material.

14. The magnetic bearing of claim 4, wherein: the axial iron core comprises a first axial iron core and a second axial iron core, and the first axial iron core and the second axial iron core are distributed and butted along an axial direction of the bearing rotor.

15. The magnetic bearing of claim 14, wherein an interior of the first axial iron core has a first cavity, an interior of the second axial iron core has a second cavity, the first cavity and the second cavity are butted to form an accommodating cavity after the first axial iron core and the second axial iron core are butted, and the permanent magnet, the magnetic conductive ring, the magnetic steel fixing frame, the bearing rotor and the radial iron core are all located in the accommodating cavity.

16. The magnetic bearing of claim 4, wherein the bearing rotor is located at an indentation on a radial inner side of the axial iron core, the radial iron core is located on a radial outer side of the bearing rotor, and the magnetic conductive ring is located on a radial outer side of the radial iron core.

17. A compressor, comprising the magnetic bearing of claim 1.

18. An air conditioner, comprising the compressor of claim 17.

19. The magnetic bearing of claim 1, wherein the magnetic bearing comprises a plurality of protruding portions, the plurality of protruding portions are arranged at intervals along a circumferential direction of the annular body, an accommodating space is formed between two adjacent protruding portions, the magnetic bearing comprises a plurality of permanent magnets arranged at intervals along the circumferential direction, and each permanent magnet is arranged in a one-to-one correspondence with the accommodating space.

20. A magnetic bearing, comprising:
an axial iron core, a permanent magnet, a magnetic conductive ring and a magnetic steel fixing frame, wherein the permanent magnet comprises a first permanent magnet located on a side of the magnetic conductive ring and a second permanent magnet located on another side of the magnetic conductive ring in an axial direction of the magnetic conductive ring, the first permanent magnet is located between the magnetic conductive ring and the axial iron core and is connected to the magnetic conductive ring and the axial iron core, and the second permanent magnet is located between the magnetic conductive ring and the axial iron core and is connected to the magnetic conductive ring and the axial iron core, wherein the magnetic steel fixing frame is capable of fixing and supporting a radial inner side of the permanent magnet,
wherein the magnetic bearing further comprises:
a bearing rotor and a radial iron core, wherein the axial iron core is in a concave shape in a radial cross section, and wherein the radial iron core, the permanent magnet, and the magnetic conductive ring are all located in a space surrounded by the axial iron core; and
a radial control winding and an axial control winding, wherein the radial control winding is wound on the radial iron core, and wherein the axial control winding is located on a radial outer side of the magnetic conductive ring.

* * * * *